United States Patent Office 3,440,279
Patented Apr. 22, 1969

3,440,279
DIRECT RESOLUTION OF THE AMMONIUM SALT OF RACEMIC N-BENZOYL DL-SERINE
Norio Sugimoto, Zezetono-machi, Otsu, Ichiro Chibata and Shigeki Yamada, Toyonaka, and Masao Yamamoto, Kyoto, Japan, assignors to Tanabe Seiyaku Co., Ltd., Osaka, Japan
No Drawing. Filed Jan. 8, 1965, Ser. No. 424,173
Claims priority, application Japan, Jan. 13, 1964, 39/1,417
Int. Cl. C07c 99/12, 103/22, 103/02
U.S. Cl. 260—519        7 Claims

ABSTRACT OF THE DISCLOSURE

A process is provided for directly resolving the ammonium salt of racemic N-benzoyl-DL-serine into its optically active components wherein a supersaturated solution of the racemic mixture in which one of said enantiomorphs that is dominant to the other is permitted to crystallize out. The dominance of the one enantiomorph can be obtained by adding seed crystals to the supersaturated solution of the racemic mixture, or by adding one enantiomorph to the hot solution before cooling to the supersaturated condition, or a combination of both procedures may be used.

---

This invention relates to the resolution of N-benzoyl-serine and more particularly to a novel process for the resolution of N-benzoyl-DL-serine in the form of the ammonium salt thereof.

Naturally occuring serine is optically active L-form and this form is an essential component of animal diets whereas the enantiomorphic D-serine has no known nutritional value. However, D-serine is very useful as an intermediate for the synthesis of the antibiotic D-cycloserine.

Synthetic serine is optically inactive and consists of equal parts of the two enantiomorphic isomers. Thus the synthetic serine can be doubled in its commercial value by resolving the mixture into D- and L-serine.

The most commonly used method of resolving DL-serine comprises treating N-acyl-DL-serine with an optically active compound known as the resolving agent such as brucine or quinine, fractionally crystallizing the resulting mixture of diastereoisomers and hydrolysing the products. Alternatively, N-acyl-DL-serine can be selectively hydrolysed by the action of acylase of various molds. These methods have been found to be disadvantageous as they require the use of expensive alkaloids or the preparation of the enzyme.

An object of this invention is to provide a new and improved process for the resolution of N-benzoyl serine which can overcome the above-mentioned disadvantages.

Broadly speaking, the process of this invention comprises producing a supersaturated solution of ammonium N-benzoyl-DL-serinate in a solvent, seeding or dissolving one of the enantiomorphic components of said racemic mixture to the solution to make said one of enantiomorphs dominant to the other enantiomorph in the solution, allowing said dominant enantiomorph to crystallize out, and recovering the same from the mother liquor.

In a preferred embodiment of this invention, a supersaturated solution of ammonium salt of racemic N-benzoyl-serine is prepared. This can be done by dissolving the racemic mixture at elevated temperature in the solvent as hereinafter described in an amount which may form a supersaturated solution when the solution is cooled down, and cooling the solution. To the supersaturated solution a small amount of crystals of one of enantiomorphic components is added as the seed and the mixture is stirred to cause fractional crystallization of the enantiomorph which is the same as that which has been seeded. Alternatively, a small amount of one of the enantiomorphs is added while the solution of racemic mixture is hot to make said enantiomorph dominant to the other in the solution and then cooling the solution thereby spontaneous crystallization of the enantiomorph which is the same as that which has been added takes place. The combination of these procedures is also possible. Namely, a part of crystals of one of enantiomorphs is added to the hot solution of racemic mixture and the remaining part is added as the seed to the supersaturated solution in which one of the enantiomorphs is dominant to the other.

The solvents employed for the process according to this invention are water, methanol and a mixture of water and alkanol of up to 3 carbon atoms.

The starting ammonium salt of N-benzoyl-DL-serine may be prepared by the conventional manner which is well known to those skilled in the art. For example, DL-serine is benzoylated with benzoylchloride or benzoic anhydride by the process described in the "Zeitschrift der Physiologischen Chemie" vol. 56, page 250, 1908, and then neutralizing the resulting product with aqueous ammonia or liquid ammonia. The proportion of the enantiomorph to be added may be that larger than 1% by weight of the racemic mixture. The upper limit should be determined based on the economy of the enantiomorph. Generally, the best results are obtained with between 2 and 12% by weight of the racemic mixture.

The temperature at which the crystallization is carried out is not critical for the invention, but it is preferred to operate at about room temperatrue, e.g., at about 15 to 30° C., through it can go as high as 45° C.

The mother liquor from which the first crop of one of the enantiomorphs is filtered off is used again for separating the optical antipode of the enantiomorph. For this purpose, the mother liquor is condensed to recover the original concentration of the enantiomorphic mixture. Alternatively, a quantity of the racemic mixture which is preferably the same as the quantity of the enantiomorph previously separated is dissolved in the mother liquor at elevated temperature. With these solutions, the procedure which has been carried out in the previous operation is repeated to separate the other enantiomorph which is the optical antipode to the anantiomorph that has been separated out in the previous operation. Thus the cycle of the operation can be repeated indefinitely by separating successively each of the enantiomorphs.

Optically active ammonium N-benzoyl serinate thus obtained can be hydrolysed to yield the corresponding optical isomers of free serine by a conventional method, e.g., by heating in diluted hydrochloric acid and recovering the resulting optically active serine hydrochloride and liberating hydrochloric acid therefrom.

The invention is more specifically illustrated by the following examples:

EXAMPLE 1

14.50 g. of ammonium salt of N-benzoyl-DL-serine and 0.90 g. of ammonium salt of N-benzoyl-L-serine are dissolved in 100 ml. of 95% aqueous methanol under heating and cooled to about 30° C.

To the mixture 0.1 g. of ammonium salt of N-benzoyl-L-serine is seeded. The mixture is gradually cooled down to 26° C. and stirred for additional 3.5 hours at the same temperature. Then the resulting crystals are filtered off and washed with methanol. After drying, 2.39 g. of ammonium salt of N-benzoyl-L-serine is obtained.

$$[\alpha]_D^{24} = +43.2° \text{ (c.}=1\text{, water)}$$

Optical purity of the product is 98.2%.

EXAMPLE 2

2.38 g. of ammonium salt of N-benzoyl-DL-serine is dissolved under heating in the mother liquor obtained after filtering the crystals in Example 1 and the solution is cooled down to about 30° C. To the solution is seeded 0.1 g. of ammonium salt of N-benzoyl-D-serine, and the mixture is gradually cooled down to 26° C. The mixture is stirred for 4 hours at the same temperature. The resulting crystals are filtered off and washed with methanol. After drying, 2.52 g. of ammonium salt of N-benzoyl-D-serine is obtained.

$[\alpha]_D^{24} = -42.6°$ (c.=1, water)

Optical purity of the product is 99.1%.

EXAMPLE 3

7.22 g. of ammonium salt of N-benzoyl-DL-serine and 0.24 g. of ammonium salt of N-benzoyl-D-serine are dissolved in 50 ml. of 95% aqueous methanol under heating. The solution is gradually cooled down and is allowed to stand for a overnight at 30° C. whereby 1.05 g. of ammonium salt of N-benzoyl-D-serine is crystallized out.

$[\alpha]_D^{24} = -38.3°$ (c.=1, water)

Optical purity of the product is 87%.

The following table shows other examples of the direct resolution of ammonium salt of N-benzoyl serine according to this invention in which the same procedure as described in Example 1 is repeated at various conditions as tabulated therein.

| Examples | Starting mixtures | Seeds | Conditions for crystallization | Products Obtained | | |
|---|---|---|---|---|---|---|
| | | | | Yields | Optical purity, percent | $[\alpha]_D^{24}$ c.=1, in water |
| 4 | Ammonium N-benzoyl-DL-serinate, 8.00 g. in 52 ml. of 95% aqueous methanol. | 1.00 g. of L-isomer | Standing for 6 hours at 30° C. | L-isomer, 1.50 g | 100 | +44.0 |
| 5 | Ammonium N-benzoyl-DL-serinate, 4.61 g., ammonium N-benzoyl-L-serinate 0.23 g. in 50 ml. of 90% isopropanol. | 0.05 g. of L-isomer | Stirring for 1.5 hours at 30° C. | L-isomer, 0.54 g | 95.5 | +42.0 |
| 6 | Ammonium N-benzoyl-DL-serinate, 9.00 g. in 50 ml. of methanol. | 1.50 g. of L-isomer | Standing for one hour at 25° C. | L-isomer, 2.40 g | 98.2 | +43.2 |
| 7 | Ammonium N-benzoyl-DL-serinate, 7.50 g., ammonium N-benzoyl-D-serinate 1.00 g. in 50 ml. of 90% aqueous ethanol. | 0.10 g. of D-isomer | Stirring for 3 hours at 28° C. | D-isomer, 1.80 g | 93.2 | −41.0 |

Example 8

4.52 g. of ammonium salt of N-benzoyl-L-serine and 45.2 ml. of 6 N hydrochloric acid are refluxed on an oil bath for 8 hours. The resulting solution is filtered and the filtrate is extracted with ether. Aqueous layer is condensed to dryness to obtain crude L-serine hydrochloride. The residue is dissolved in 50 ml. of water. The solution is passed through a column of Amberlite IR-120 in H form to absorb L-serine hydrochloride onto the resin. The resin is eluted with 5% of aqueous ammonia and the elute is condensed to dryness whereby 1.83 g. of crude L-serine is obtained. Crude L-serine thus obtained is recrystallized from aqueous ethanol to obtain 1.39 g. of L-serine.

$[\alpha]_D^{24} = +15.2°$ (c.=2, in N-HCl)

What we claim is:

1. A process for obtaining one of the enantiomorphs of serine substantially free from the other enantiomorph from a racemic mixture thereof, comprising the steps of forming the ammonium salt of racemic N-benzoyl-DL-serine, thereafter directly resolving said ammonium salt into its optically active components by dissolving the racemic mixture in a hot solvent therefor, adding to the hot solution one of the enantiomorphs, cooling to obtain a supersaturated solution and then seeding with crystals of said one enantiomorph to initiate crystallization of said enantiomorph from the solution, recovering said crystallized enantiomorph and acid-hydrolyzing said recovered crystals to obtain the desired enantiomorph.

2. The process of claim 1 in which the solvent is selected from the group of water, methanol and mixtures of water and an alkanol of up to 3 carbon atoms.

3. A process for obtaining one of the enantiomorphs of serine substantially free from the other enantiomorph from a racemic mixture thereof, comprising the steps of forming the ammonium salt of racemic N-benzoyl-DL-serine, thereafter directly resolving said ammonium salt into its optically active components by producing a supersaturated solution of the racemic mixture in a solvent therefor, adding seed crystals of one of the enantiomorphs to initiate crystallization of said enantiomorph from the solution, recovering said crystallized enantiomorph and acid-hydrolyzing said recovered crystals to obtain the desired enantiomorph.

4. The process of claim 3 in which the solvent is selected from the group of water, methanol and mixtures of water and an alkanol of up to 3 carbon atoms.

5. A process for obtaining one of the enantiomorphs of serine substantially free from the other enantiomorph from a racemic mixture thereof, comprising the steps of forming the ammonium salt of racemic n-benzoyl-DL-serine, thereafter directly resolving said ammonium salt into its optically active components by adding to a hot solution of the racemic mixture in a solvent therefor one of the enantiomorphs, cooling to obtain supersaturated solution and, on further standing, crystals of said one enantiomorph, recovering said crystallized enantiomorph and acid-hydrolyzing to obtain the desired enantiomorph.

6. The process of claim 5 in which the solvent is selected from the group of water, methanol and mixtures of water and an alkanol of up to 3 carbon atoms.

7. The compound ammonium N-benzoyl-DL-serinate.

References Cited

Chemistry of the Amino Acids, Greenstein et al., vol. 1 (1961), QP 801.A5G7–C.3, page 715 relied on.

LORRAINE A. WEINBERGER, *Primary Examiner.*

L. A. THAXTON, *Assistant Examiner.*

U.S. Cl. X.R.

260—534